United States Patent [19]
Yoo

[11] Patent Number: 5,757,519
[45] Date of Patent: May 26, 1998

[54] VIDEO PRESENTER WITH DETACHABLE LOWER ILLUMINATION CASE

[75] Inventor: Myung-ho Yoo, Suwon, Rep. of Korea

[73] Assignee: Samsung Aerospace Industries, Ltd., Kyongsangnam-do, Rep. of Korea

[21] Appl. No.: 601,438

[22] Filed: Feb. 14, 1996

[30] Foreign Application Priority Data

Feb. 25, 1995 [KR] Rep. of Korea .................. 95-3769

[51] Int. Cl.⁶ .................................................. H04N 1/04
[52] U.S. Cl. ............................ 358/475; 358/474; 355/70
[58] Field of Search .............................. 358/471, 474, 358/475, 487, 496, 497; 355/21, 39, 64, 70, 75; 399/220, 221; H04N 1/04

[56] References Cited

U.S. PATENT DOCUMENTS

| | | | |
|---|---|---|---|
| 4,825,295 | 4/1989 | Ishikawa et al. | 358/494 |
| 5,247,330 | 9/1993 | Ohyama et al. | 355/64 |
| 5,608,537 | 3/1997 | Manabe et al. | 358/474 |

*Primary Examiner*—Kim Yen Vu
*Attorney, Agent, or Firm*—Finnegan, Henderson, Farabow, Garrett & Dunner, L.L.P.

[57] ABSTRACT

A video presenter for radiating light toward an object, such as a film negative or transparency, includes an illuminating unit detachably installed within a pallet supporting the object for photographing. To obtain a superior-quality image by uniformly passing light through the object, a recessed portion is formed in the pallet and the illuminating unit is detachably inserted therein. The detachable nature of the illuminating portion permits it to be used apart from the video presenter for other purposes. Further, the illuminating unit may include a diffusion panel for diffusing light emitted by plural light sources; the diffused light being directed upwardly to illuminate the object.

13 Claims, 5 Drawing Sheets

VIDEO PRESENTER WITH DETACHABLE LOWER ILLUMINATION CASE

BACKGROUND OF THE INVENTION

A. Field of the Invention

The present invention relates to a video presenter for radiating light to an object and capturing an image of the object, and more particularly, to a video presenter for taking an object image by means of a camera and displaying the image through a display device.

B. Description of the Prior Art

The video presenter captures an object image, e.g., a printed document and reduces or enlarges the object image to output the image via a display device, such as a television or projector. Typically, an assembly including a charge-coupled device camera and a microscope lens is employed.

FIG. 1 is a perspective view of the major elements of a conventional video presenter.

As shown in FIG. 1, a camera 10 rotatably couples with a camera supporting rod 11. To provide adjustable extension of the camera 10, the camera supporting rod 11 telescopically inserts into a main support 12. The main support 12 attaches to the midsection of a mounting unit 21, which connects with one side of a pallet 20, such that the inclination of the main support 12 can be adjusted as required. The upper surface of the pallet 20 is planar so that an object to be photographed can be placed thereon. A pair of upper lights 30 are installed on either side of the mounting unit 21, for radiating light toward an object placed on the pallet 20 while photographing the object. The radiated light reflects upward from the object and enters the camera 10. Accordingly, the camera 10 receives the image of the object.

Meanwhile, to photograph a transparent object such as a film (transparency) laid on the upper surface of the pallet 20, a lower illuminating portion 40 is fixed inside the pallet 20. The lower illuminating portion 40 comprises a pair of fluorescent lamps 41. The upper surface of the pallet 20 includes a glass plate 37 for passing light from the lower illuminating portion 40.

As described above, in the conventional video presenter, the lower illuminating portion 40 is fixed inside the pallet 20 to photograph transparent objects, and cannot therefore be used for other purposes which can be obtained by separation from the pallet. Further, due to a wide discrepancy in light intensity across the surface of the pallet, it is difficult to obtain superior quality photographs of the objects.

SUMMARY OF THE INVENTION

Accordingly, the present invention is directed to a video presenter that overcomes the limitations and disadvantages of the related art.

It is an object of the present invention to provide a video presenter including a lower illuminating portion detachably installed in a pallet to be used for other purposes upon separation from the pallet.

It is another object of the present invention to provide a video presenter in which light uniformly passes through an object from the lower illuminating portion.

To achieve the objects and in accordance with the purpose of the invention, as embodied and broadly described herein, the invention comprises a pallet for receiving an object; a support attached to the pallet; a camera mounted on the support for photographing the object on the pallet; and lower illuminating means detachably installed within the pallet for irradiating light upwardly toward the object.

In the video presenter according to the present invention, the pallet may include a recessed portion for receiving the lower illuminating means.

In the present invention, it is preferred that the lower illuminating means comprises one or more light sources and a diffusion panel for diffusing light radiated from the light sources.

Additional objects and advantages of the invention will be set forth in part in the description which follows, and in part will be obvious from the description, or may be learned by practice of the invention. The objects and advantages of the invention will be realized and attained by means of the elements and combinations particularly pointed out in the appended claims.

The accompanying drawings are included to provide a further understanding of the invention and are incorporated in and constitute a part of the specification. The drawings illustrate several embodiments of the invention and together with the description, serve to explain the principles of the invention.

DESCRIPTION OF THE PREFERRED EMBODIMENTS

Figure 1:
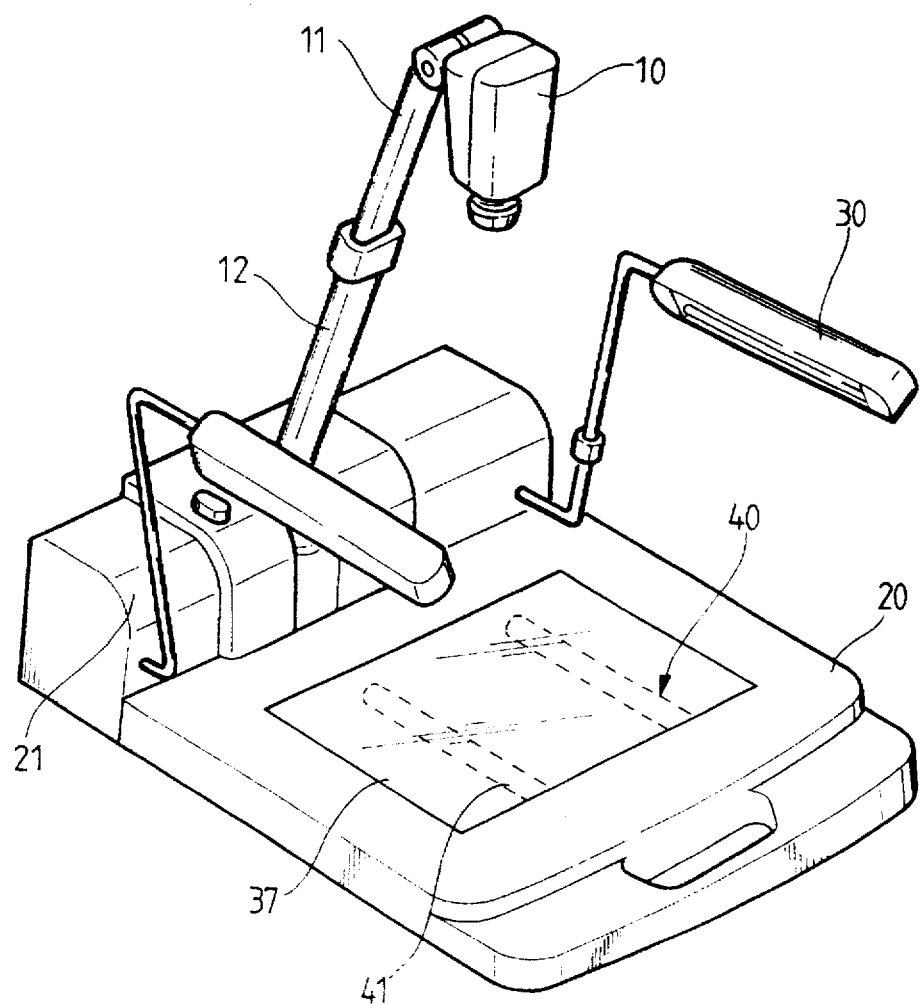
FIG. 1 is a perspective view of the major elements of a conventional video presenter.

Reference will now be made in detail to the present preferred embodiments of the present invention, examples of which are illustrated in the accompanying drawings.

As broadly depicted in FIG. 2, a pallet 22 has a flat upper surface on which an object is placed to be photographed and a recessed portion 25 for accommodating a lower illuminating portion 40, which will be described later.

As with the conventional video presenter, the present invention also provides a camera 10 rotatably coupled with a camera supporting rod 11. The camera supporting rod 11 telescopically inserts into a main support 12, which attaches to the midsection of a mounting unit 21, such that adjustable extension of the camera position can be obtained. The main support 12 is adapted for adjustment of its inclination angle. Also, the mounting unit 21 connects with one side of a pallet 22. A pair of upper lights 30 are installed on either side of the mounting unit 21, for radiating light toward an object to be photographed.

As a characteristic feature of the present invention, the Lower illuminating portion 40 projects light toward a transparent object and detachably inserts into the recessed portion 25 of the pallet 22.

Figure 2:
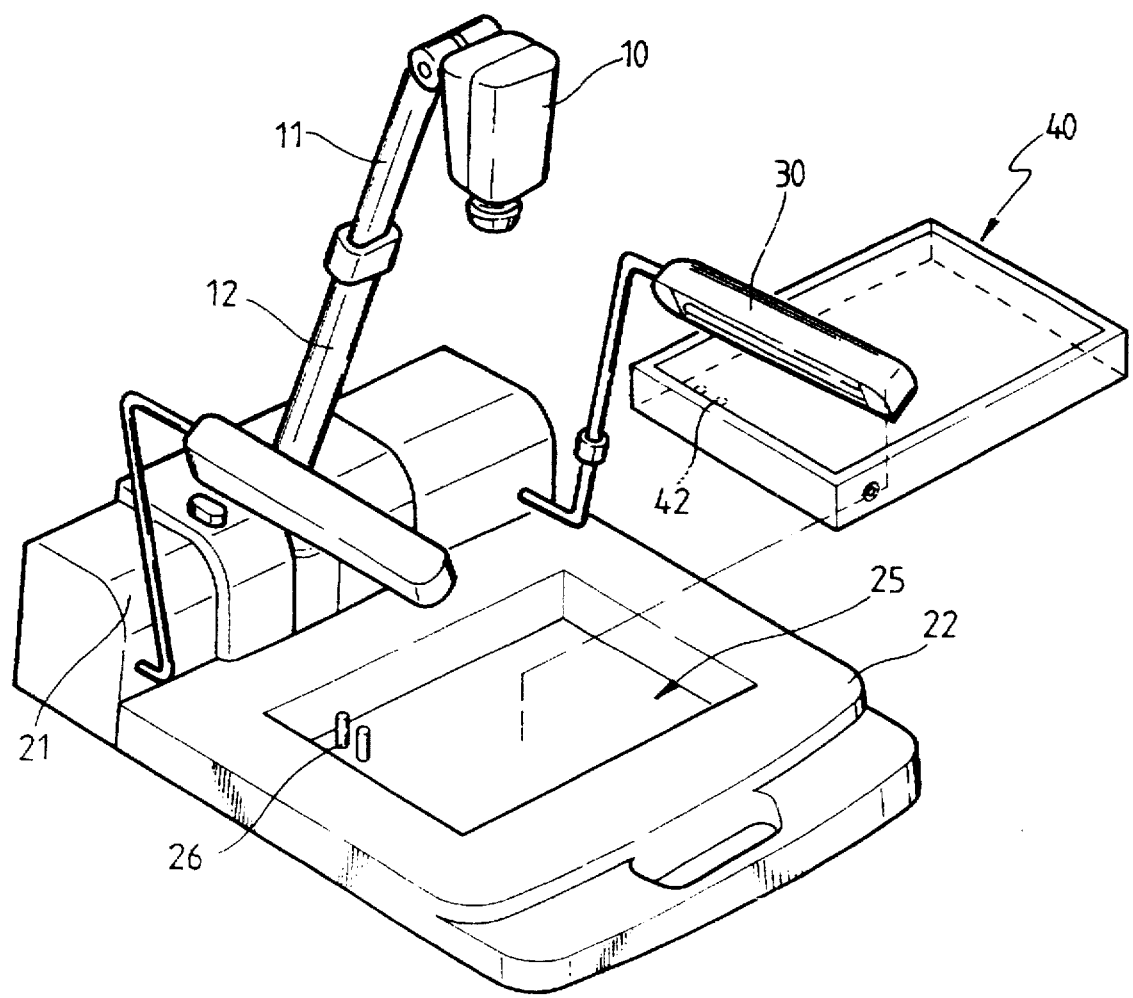
FIG. 2 is a perspective view of a video presenter according to one embodiment of the present invention.

FIG. 2 shows power jacks 26 for electrical connection with receptacles 42 of the lower illuminating portion 40. The power jacks 26 are installed in the bottom of the recessed portion 25 so that power from the pallet 22 is supplied to the lower illuminating portion 40, when the lower illuminating portion 40 is seated within the recessed portion 25.

Figure 3:
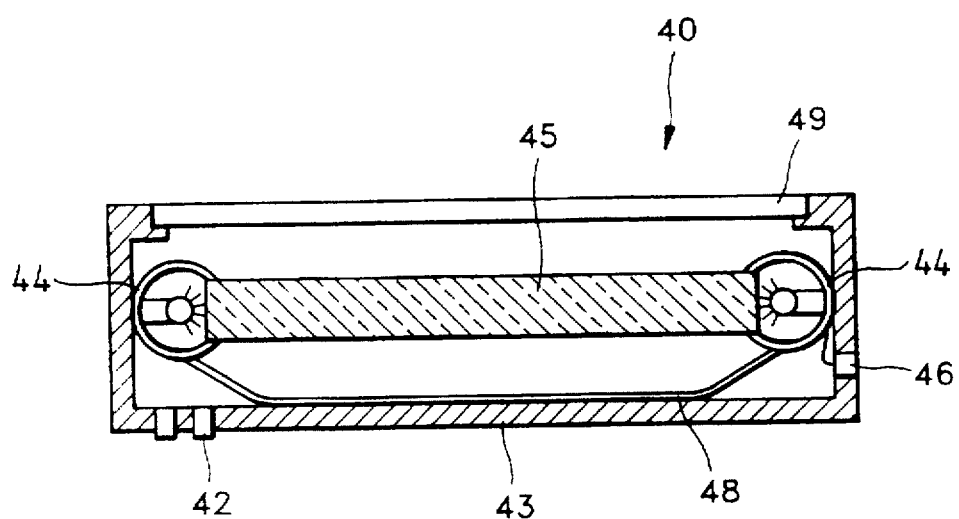
FIG. 3 is a sectional view of a lower illuminating portion for use in the video presenter of FIG. 2.

FIG. 3 illustrates a section view of the lower illuminating portion 40. A pair of fluorescent lamps 44 are installed on opposing inner walls of a case 43 having the same shape as the recessed portion 25(see FIG. 2). A diffusion panel 45 installed between the fluorescent lamps 44 diffuses light emitted from fluorescent lamps 44 to uniformly radiate upwardly and downwardly. A connecting socket 46 for supplying external power to the fluorescent lamps 44 is provided on one sidewall of the case 43 for use when the lower illuminating portion 40 is separated from the pallet 22(see FIG. 2). A reflection panel 48 is installed at the base of the case 43, under the diffusion panel 45, for reflecting the downwardly-radiated diffused light upwardly. A translucent panel 49, preferably made of white acrylic resin, is installed above the diffusion panel 45 to form the upper surface of the case 43. The light, which is diffused by the diffusion glass panel 45, passes through the translucent panel 49 uniformly. Additionally, an object, such as a film, may be placed on the upper surface of the white acrylic resin panel 49.

When the lower illuminating portion 40 is inserted into the recessed portion 25(see FIG. 2) of the pallet 22(see FIG. 2), the receptacles 42 are connected with the power jacks 26(see FIG. 2), thereby supplying electrical power to the fluorescent lamps 44. However, when the lower illuminating portion 40 is used separately from the pallet 22(see FIG. 2), power is supplied externally via the connecting socket 46, and a power cord (not shown).

Figure 4:
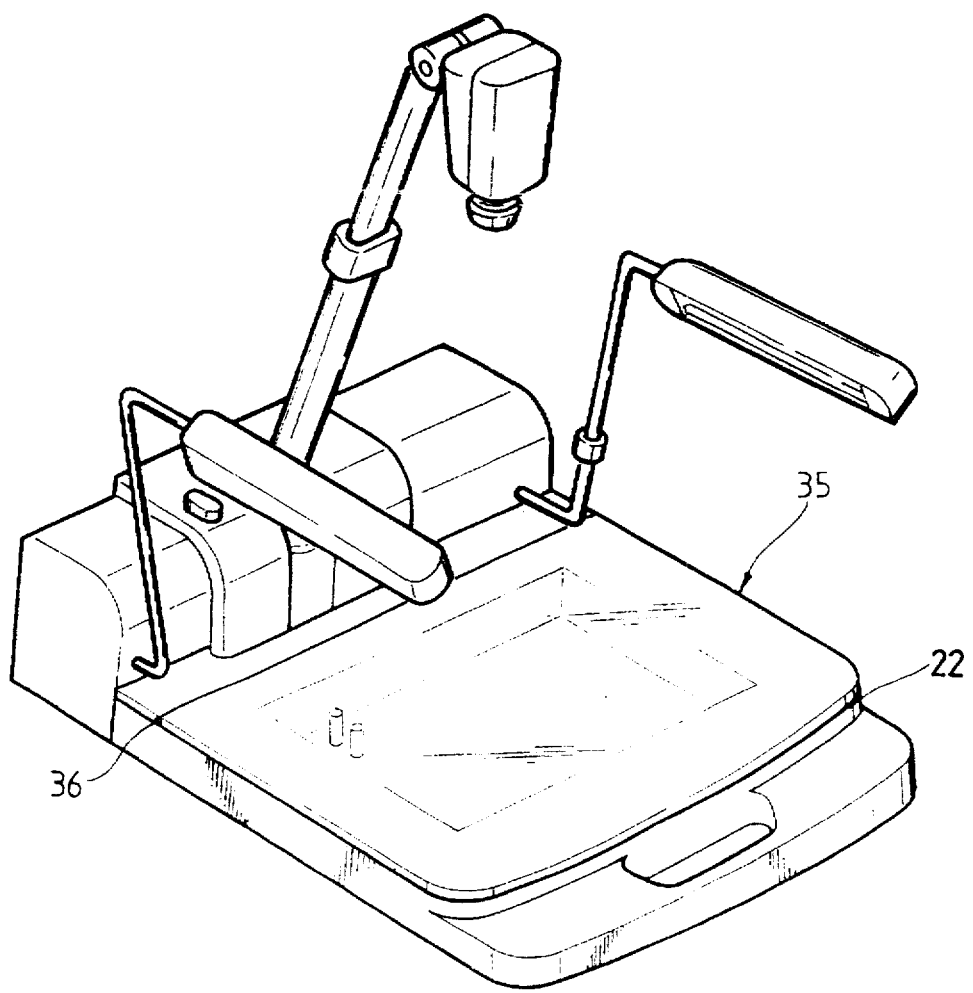
FIG. 4 is a perspective view of a video presenter according to another embodiment of the present invention, which has a transparent panel installed on the upper surface of a pallet.

FIG. 4 is a perspective view illustrating a video presenter according to another embodiment of the present invention. A hinged transparent panel may be installed on the pallet. The transparent panel 35, which is installed on the upper surface of pallet 22, pivots around a hinge 36 to be opened and closed. Accordingly, the lower illuminating portion 40 can be inserted or removed by lifting the transparent panel 35 as shown in FIG. 5.

Figure 5:
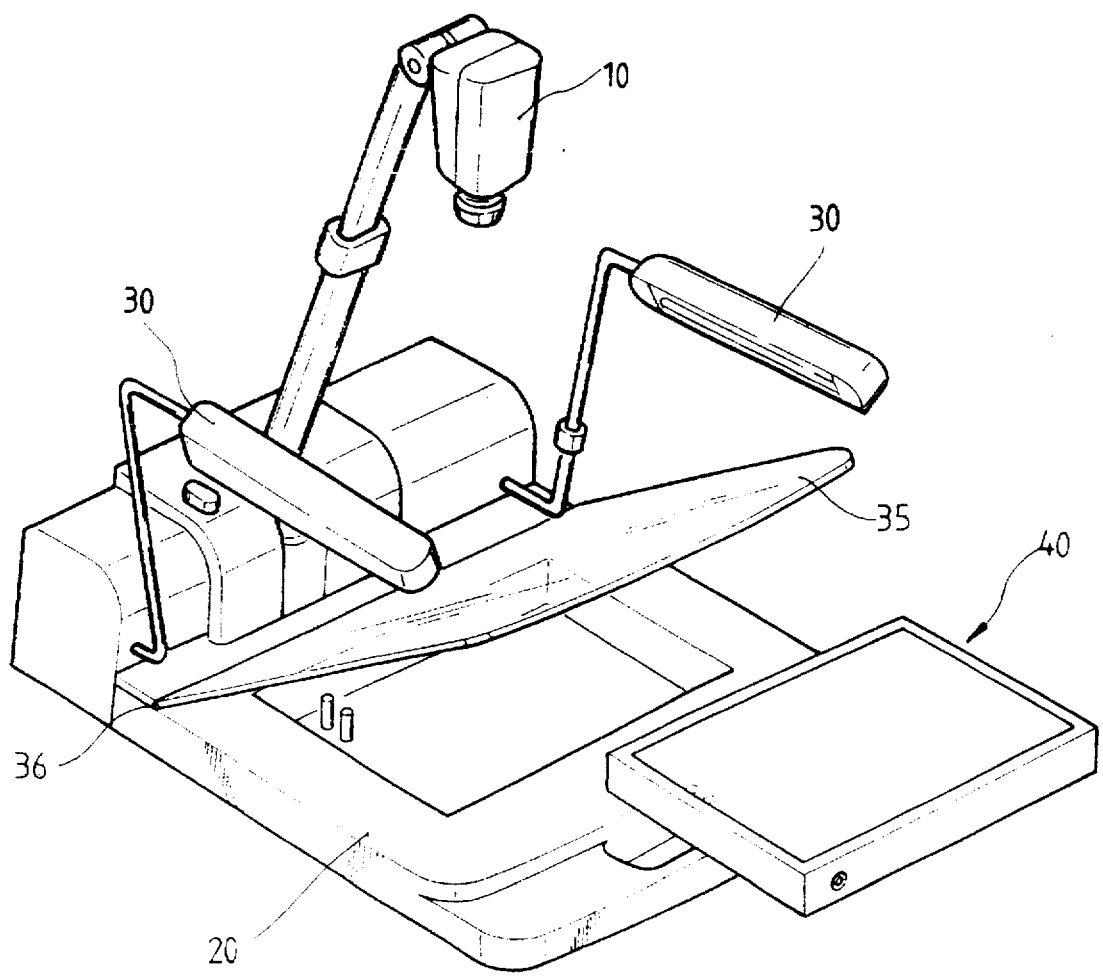
FIG. 5 is a perspective view of the video presenter shown in FIG. 4, illustrating the transparent panel in the open position and the lower illuminating portion separated from the pallet.

Meanwhile, referring to FIGS. 4 and 5, even if the lower illuminating portion 40 is removed from the pallet 22, an object placed on the transparent panel 35 can be photographed by camera 10 using illumination from the upper lights 30. The transparent panel 35 prevents foreign substances from intruding into the recessed portion 25 of the pallet 22. When the lower illuminating portion 40 is inserted into the recessed portion 25 of the pallet 22 to photograph a transparency (film), the image thereof can be photographed by passing light from the lower illuminating portion 40 through the transparent panel 35 and the film itself.

As described above, in the video presenter according to the present invention, the lower illuminating portion is detachably inserted into the recessed portion formed in the pallet and can be used for other purposes, thereby providing greater convenience to a user. Additionally, an image of superior quality can be obtained by the use of a diffusion panel for uniformly diffusing light from the lower illuminating portion.

The separate use of the lower illuminating portion provides merits as follows. First, an object of a greater size can be illuminated when photographed by the camera. That is, when a large object such as a large X-ray film is placed on the lower illuminating portion in a state where the lower illuminating portion is installed in the pallet, the X-ray film bumps on the mounting unit (See 21 of FIG. 2) and cannot be moved properly so that the center portion of the X-ray film cannot be illuminated. However, when the lower illuminating portion is used separately, the large X-ray film does not bump on the support and thus the object of a greater size can be illuminated. Second, the separated lower illuminating portion can also be used by being erected. Accordingly, viewers can see the X-ray film by means of the erected lower illuminating portion when instruction is given to the viewers.

While there has been illustrated and described what is at present considered to be a preferred embodiment of the present invention, it will be understood by those skilled in the art that various changes and modifications may be made, and equivalents may be substituted for elements thereof without departing from the true scope of the invention. Therefore, it is intended that this invention not be limited to the particular embodiment disclosed herein, but that the invention include all embodiments falling within the scope of the appended claims.

What is claimed is:

1. A video presenter comprising:
   a pallet for receiving an object;
   a support attached to said pallet;
   a camera mounted on said support for photographing the object on said pallet; and
   lower illuminating means detachably installed within said pallet for radiating light toward the object, said lower illuminating means comprising:
   an upper translucent panel for receiving an object;
   at least one light source; and
   a diffusion panel for diffusing light radiated form said light source.

2. The video presenter of claim 1, further comprising upper illuminating means attached to and oriented above said pallet for radiating light toward the object.

3. The video presenter of claim 1, further comprising means for supplying electrical power from said pallet to said lower illuminating means.

4. The video presenter of claim 3, wherein said power supplying means comprises mating electrical connectors on said pallet and said lower illuminating means.

5. The video presenter of claim 1, wherein said pallet has a recessed portion for receiving said lower illuminating means.

6. The video presenter of claim 5, further comprising a transparent cover mounted on said pallet for opening and closing said recessed portion of said pallet.

7. The video presenter of claim 1, wherein said lower illuminating means further comprises a reflector located beneath said diffusion panel for reflecting diffused light.

8. The video presenter of claim 1, wherein said lower illuminating means further comprises an electrical socket for receiving external power.

9. The video presenter of claim 1, wherein said lower illuminating means further comprises means positioned above the diffusion panel for passing the diffused light therethrough.

10. The video presenter of claim 1, wherein said lower illumination means includes two light sources and said diffusion panel is positioned between said light sources.

11. The video presenter of claim 1, wherein said diffusion panel is located directly adjacent said light source.

12. A video presenter comprising:
    a pallet having a recessed portion for receiving an object;
    a transparent cover mounted on said pallet for opening and closing said recessed portion of said pallet;
    a case detachably installed in said recessed portion of said pallet;

light sources positioned in said case;

a diffusion panel positioned in said case between said light sources for diffusing light radiated from said light sources;

means included with said case in a position above said diffusion panel for passing the diffused light therethrough;

a reflection panel located in said case beneath said diffusion panel for reflecting the diffused light toward said light passing means;

a socket in said case for receiving external power; and mating electrical connectors included with said pallet and said case for supplying power from said pallet to said light sources.

13. A video presenter comprising:

a pallet having a recessed portion for receiving an object;

a support attached to said pallet;

a camera mounted on said support for photographing the object on said pallet;

upper illuminating means attached to and oriented above said pallet for irradiating light toward the object;

a case detachably installed in said recessed portion of said pallet;

light sources positioned in said case;

a diffusion panel positioned in said case between said light sources for diffusing light radiated from said light sources;

means included with said case in a position above said diffusion panel for passing the diffused light therethrough;

a reflection panel located in said case beneath said diffusion panel for reflecting the diffused light toward said light passing means;

a socket in said case for receiving external power; and mating electrical connectors included with said pallet and said case for supplying power from said pallet to said light sources.

* * * * *